United States Patent [19]

Schloss

[11] Patent Number: 5,298,176
[45] Date of Patent: Mar. 29, 1994

[54] CONTROLLED VELOCITY SETTLING TANK

[75] Inventor: C. M. Schloss, Englewood, Colo.

[73] Assignee: Schloss Engineered Equipment, Inc., Aurora, Colo.

[21] Appl. No.: 927,857

[22] Filed: Aug. 10, 1992

[51] Int. Cl.$^5$ ............................................. B01D 21/00
[52] U.S. Cl. .................................. 210/803; 210/767; 210/87; 210/319; 210/532.2; 210/208; 210/537
[58] Field of Search ............... 210/803, 87, 208, 319, 210/532.2, 767, 512.1, 537

[56] References Cited

U.S. PATENT DOCUMENTS

| | | | |
|---|---|---|---|
| 1,737,624 | 12/1929 | Thomson | 366/296 |
| 2,179,246 | 11/1939 | Applebaum | 366/295 |
| 3,705,099 | 12/1972 | Hunter | 210/767 |
| 3,984,331 | 10/1976 | Paige | 210/537 |
| 4,176,064 | 11/1979 | Black | 210/512.1 |

Primary Examiner—Robert A. Dawson
Assistant Examiner—Ana M. Fortuna
Attorney, Agent, or Firm—Beaton & Swanson

[57] ABSTRACT

A settling tank for settling inorganic matter such as sand, grit and plastic from a fluid stream such as a waste water stream entering a waste water treatment facility. A set of mechanical mixers directing energy into the fluid stream so as to cause spiraling flow parallel to a substantially horizontal axis. The mixer shaft is rotated by a motorized drive, the speed of which is adjustable to account for variations in fluid flow rate so that an optimal balance is achieved between the settling of inorganic solids and continuing suspension and resuspension of organic solids for subsequent treatment.

8 Claims, 1 Drawing Sheet

CONTROLLED VELOCITY SETTLING TANK

FIELD OF THE INVENTION

The present invention relates to settling tanks and, in particular, to settling tanks for removing grit and other dense non-organic matter from the water in a waste water treatment facility by use of gravity settling from a fluid stream.

BACKGROUND OF THE INVENTION

Waste water entering a waste water treatment facility normally includes a substantial quantity of sand, grit and plastic, in addition to suspended settleable organic matter (sludge). One of the first steps in treating the waste water is to remove these non-organic solids so that the waste water can then be treated by oxidation and biodegradation techniques without the non-organic solids fouling or wearing out the mechanical components of the facility. Frequently the plant design requires that inorganic solids having a specific gravity of 2.65 and higher and a size of 65 mesh or larger should be removed before further treatment of waste water.

Although it is important that the non-organic solids be removed early in the treatment process, it is equally important that the organic solids such as sewage sludge not be removed at that point. This is because at that point the waste water has not been subjected to the oxidation and biodegradation processes that clean the water by consuming the sewage. Therefore, if the organic solids are removed along with the inorganic solids before the treatment process, then the removed solid will contain raw sewage which presents difficult problems of storage and disposal of a possibly hazardous waste.

Fortunately, the inorganic solids are generally distinguishable from the organic solids on the basis of their specific gravities. Inorganic solids such as sand and grit tend to be much denser than organic solids such as sludge. Therefore, inorganic solids tend to settle to the bottom of a fluid stream quicker than organic solids.

In most of the existing waste water treatment facilities, it is this difference in density between inorganic solids and organic solids that is used to remove the inorganic solids. Typically, the incoming waste water flows through an inorganic removal chamber that may be referred to as a "grit chamber" or "settling tank". The settling tank normally operates with a continuous flow through it, rather than as a batch at a time. Waste water flows into the chamber through an inlet and out through an outlet. At the bottom of the tank is generally a mechanism for collecting the material that settles to the bottom between the inlet and outlet. The collection mechanism is commonly a set of buckets on a continuous chain which scoop up the material and transport it and dump it into a collection point, or an airlift pump which pumps the grit from the bottom of the chamber to an outside collection point, or some other suitable mechanical or electromechanical system.

It can be appreciated that the removal efficiency of a settling tank is directly affected by the flow rate through the tank. With a high flow rate the retention time of the waste water in the tank is quite low, and so the solids have little time to settle to the bottom where they can be collected. In addition, a high flow rate tends to induce turbulence in the tank, which further impairs and slows the settling of solids. On the other hand, a low flow rate produces a high retention time for the waste water and also promotes laminar flow. The combination of a higher retention time and more laminar flow in low flow conditions as compared to high flow conditions, allows more solids to settle.

This relationship between flow rate and the efficiency of solids removal presents a problem in the design and operation of the settling tanks. It is desired that the flow rate through the settling tank be sufficiently low that inorganic solids are settled and removed, or at least the larger and denser inorganic solids are settled and removed. But as explained above, it is important that the flow rate not be so low that the organic solids are settled and removed. Therefore, unless the relationship between settling efficiency and flow rate is addressed in some manner, a settling tank will achieve the optimal balance between removal of inorganic solids and removal of organic solids at one flow rate, but will remove too little of the inorganic solids at higher flow rates and too much of the organic solids at lower flow rates.

The way this problem has typically been addressed is to induce a flow in the settling tank that is independent of the flow rate of waste water through the settling tank. This induced flow does not have much effect on the average retention times in the settling tank, but it does have an important effect on the turbulence of the settling tank. The settling efficiency then becomes more a function of the induced flow conditions than a function of the flow rate, thereby diminishing the effect of flow rate on settling efficiency. In addition, the induced flow can be made variable to respond to changing flow rates. At a high flow rate, which results in low retention times and high turbulence, the induced flow can be minimized so that the settling tank will collect the inorganic solids. At a low flow rate, which results in high retention times and low turbulence, the induced flow can be maximized so that the settling tank will not collect the organic solids. In other words, the induced flow mechanism varies the variables that determine settling efficiency (turbulence and water velocity) to offset changes in the other variable (retention times). The variances in the induced flow that are necessary to offset variances in the retention times can be determined by experimentation and by known principles of fluid dynamics based on the dimensions and configuration of the settling tank and the characteristics of the waste water.

The systems for inducing a flow in the settling tank are generally either those that induce a flow about a vertical axis or those that induce a flow about a horizontal axis. Those that induce a flow about a vertical axis commonly use an impeller mounted on a vertical shaft near the center of the settling tank, so that fluid circulates in one vertical direction through the impeller near the center of the tank and then in the opposite direction along the walls of the tank. Due to the action of the impeller, the fluid also tends to circulate about the impeller shaft, thereby resulting in a spiralling toroidal flow pattern as the fluid circulates about the shaft simultaneously with its vertical movement. While such a "vertical shaft mixer" design can be effective in theory, tanks with such designs tend to be quite inefficient because of the asymmetric flows as seen in plan view, and turbulence caused by the conservation of angular momentum, i.e. the Coriolis effect.

The other type of system for inducing a flow in the settling tank, in which the flow is about a horizontal axis, typically relies upon the injection of compressed air from a line of jets positioned horizontally in the settling tank. The horizontal position of the line of jets is generally offset from the horizontal centerline of the settling tank, so that the rising air bubbles in the fluid drive the fluid upward on the side of the tank having the jets, across the top of the tank toward the wall opposite the jets, down the wall opposite the jets and across the bottom of the tank back to the wall with the jets. At the same time, the fluid is flowing through the tank perpendicular to the direction of the induced flow, so that the overall result is a spiral flow about the longitudinal axis of the tank. A serious drawback to the use of compressed air jets to induce flow in the settling tank is that the degree of induced flow cannot be modulated closely as a function of flow rates. The induced flow tends to be either "on" or "off" but with no reliable and precise way of adjusting it.

It can be appreciated that there is a need for a system to produce an induced flow in a settling tank in a way that is reliable, simple and adjustable. Preferably such a system would be adaptable for use with settling tanks that are currently in existence without the need for extensive design changes.

SUMMARY OF THE INVENTION

The present invention is a system with a mixing device to index a flow about a horizontal axis in a settling tank. The mixing device is simple to manufacture, install and operate. While it may resemble a horizontal paddle wheel flocculator, it is designed differently. It is also easily controllable to precisely vary the induced flow as a function of flow rates through the settling tank, in order to obtain a desired efficiency of inorganic solids removal without obtaining too much organic solids removal.

A substantially horizontal channel allows fluid flow from an inlet end to an outlet end. The fluid moves roughly spirally down the channel, the longitudinal component of the spiral movement being caused by the overall flow from the inlet to the outlet, and the circular component of the spiral movement being caused by a mechanical flow inducer. The mechanical flow inducer is adjustable to impart greater induced flow at low flow conditions to prevent the settling of organic solids, and lower induced flow at high flow conditions to allow the settling of inorganic solids.

The mechanical flow inducer itself may include a set of paddles mounted on a horizontal shaft parallel to the direction of flow from the inlet to the outlet. The shaft is submerged in the fluid and is supported by two or more bearings, and is driven by an adjustable speed motor or other variable speed drive. The drive mechanism between the motor and the shaft may include suitable reducing systems and a sprocket and chain design.

DETAILED DESCRIPTION OF THE INVENTION

Figure 1:
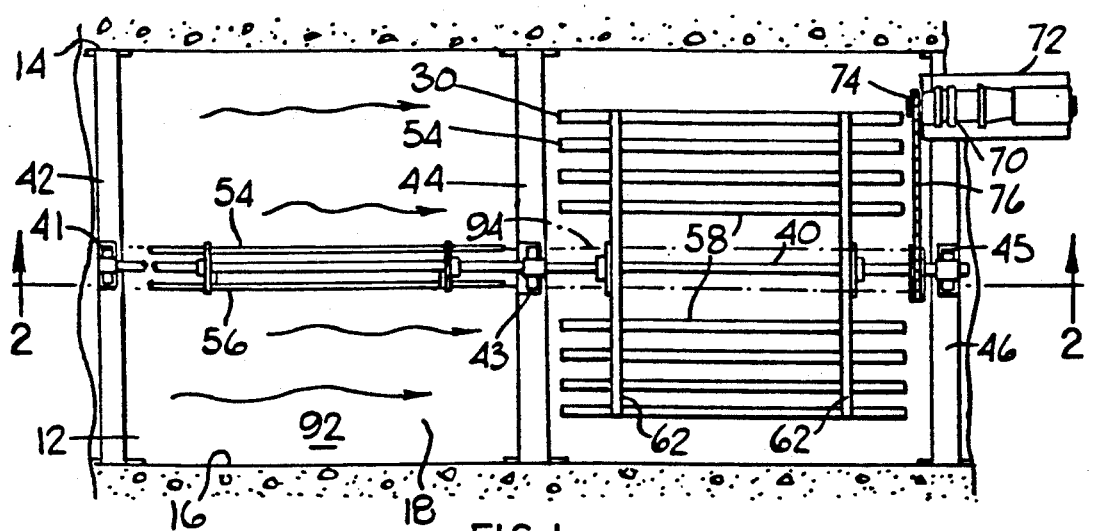
FIG. 1 is a plan view of the present invention.
Figure 2:
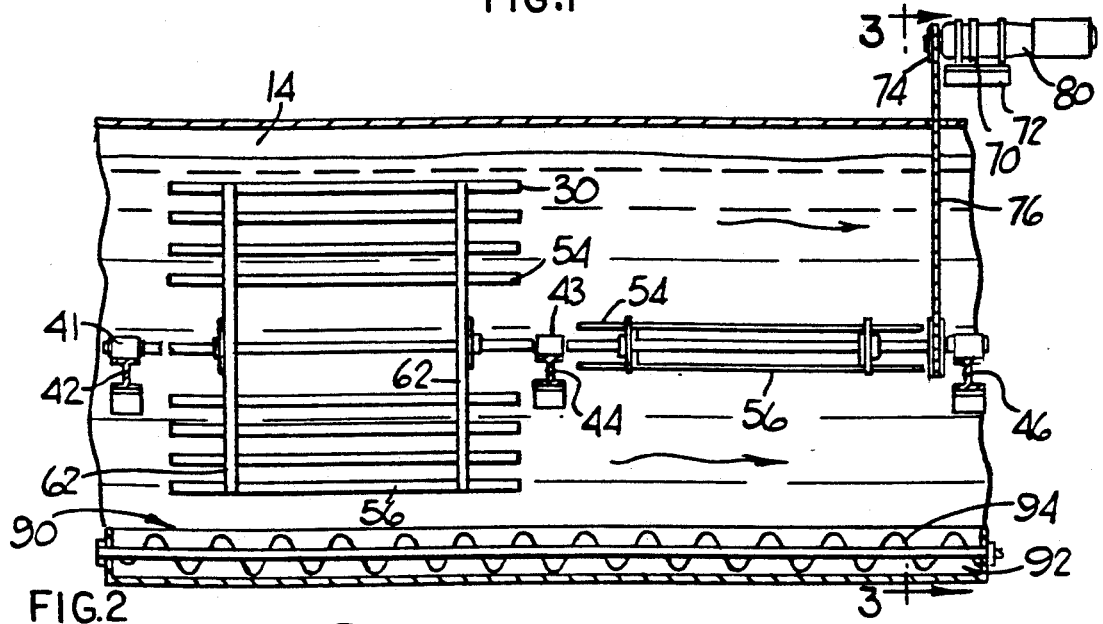
FIG. 2 is a side sectional view of the present invention.
Figure 3:
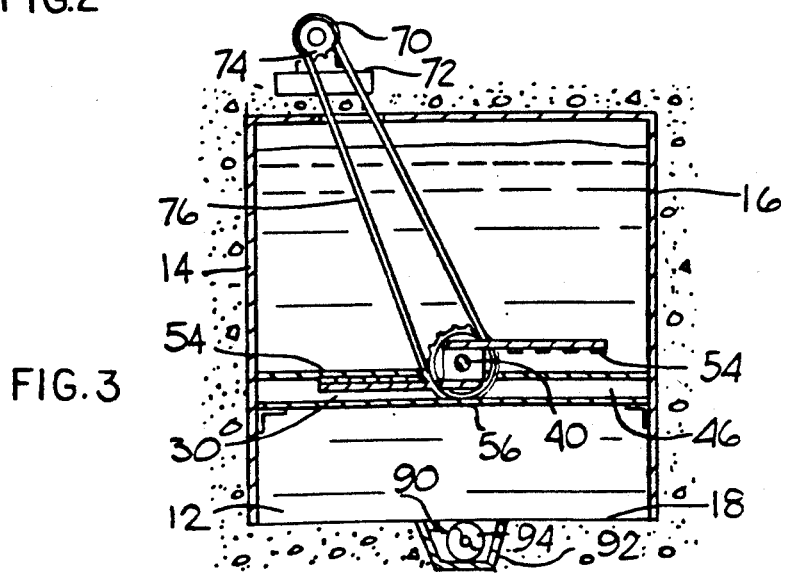
FIG. 3 is an end sectional view of the present invention, taken along line 33 of FIG. 2.

A plan view, a side sectional view and an end sectional view of the present invention are shown in FIGS. 1, 2 and 3, respectively. Fluid containing inorganic solids such as sand grit and plastic flows through a channel 12 of a setting tank having a left-hand wall 14, a right-hand wall 16 and a bottom 18 to contain the fluid. The channel may include a set of weirs to control flow rates (not shown) such as an entry weir and an exit weir. The channel is typically a cast concrete element with dimensions sufficient to accommodate the desired flow rate while still providing a retention time that will allow the desired inorganic solids to settle to the bottom 18 of the channel.

At the bottom of the channel is a grit collector of the type known in the art. The grit collector in the preferred embodiments shown in the figures is a screw type collector. The collector 90 includes a trough 92 in the channel bottom 18 which contains a screw 94. The screw drives grit collected in the trough 92 to one end of the trough where it is removed. Many other grit collector systems are known in the art for collecting inorganic solids once they settle to a channel bottom, and such other grit collectors could also be adapted for use with the present invention. The grit collector may comprise, for example, a set of collecting buckets mounted on and spaced along a drive mechanism such as a continuous chain. The drive mechanism drags the buckets across or just above the bottom 18 of the channel 12, typically against the direction of fluid flow from a downstream location to an upstream location to collect the settled material. The drive mechanism then carries the buckets with their load of collected material up and out of the fluid, inverts the buckets to dump the collected material into a collection bin which is periodically emptied, and then submerges the buckets in the fluid and returns them to the channel bottom 18 at the downstream location.

Contained within the channel 12 and positioned beneath the fluid surface is a mixer 30. The mixer 30 in the embodiment of FIGS. 1-3 includes a center drive shaft 40 which is rotatably mounted in the longitudinal direction in the channel 12 by a set of bearings 41, 43 and 45 to a set of supports 42, 44 and 46. The supports 42, 44 and 46 rest on the channel sides 14 and 16. The mixer 30 may include an upstream portion and a downstream portion, which are essentially the same except that the upstream portion is positioned upstream from the downstream portion and the plane of the upstream portion is at roughly a right angle to the plane of the downstream portion. Both the upstream portion and downstream portion of the mixer 30 have a pair of mixing paddles 54 and 56 extending radially from the drive shaft 40. Each mixing paddle 54 and 56 has a set of slats 58 extending parallel to the drive shaft and lying substantially in a plane extending radially outward from the drive shaft 40. Each set of slats 58 is mounted to a pair of brackets 62 which hold the slats together and attach them to the drive shaft 40. It can be seen that the mixing paddles 54 and 56 form an effective mechanism for mixing the fluid circularly about the drive shaft 40 upon rotation of the drive shaft 40.

The drive shaft 40 is driven by suitable drive means such as the chain and sprocket arrangement shown in FIGS. 1-3. A motor 70 is mounted on a platform 72 positioned above the surface of the fluid. An upper sprocket 74 mounted to the motor shaft receives a chain 76 which extends from the upper sprocket 74 to a lower sprocket 78 which is mounted to the drive shaft 40. The revolution of the shaft of the motor 70 thus revolves the upper sprocket 74 to drive the chain 76, which thereby revolves the lower sprocket 78 and turns the drive shaft 40. The turning drive shaft causes the mixing paddles 54 and 56 to turn about the drive shaft.

The fluid flows in the direction of the arrows in FIGS. 1-2. Simultaneously, the mixing paddles 54 and 56 are turned about the drive shaft 40 to urge the fluid about the drive shaft 40. The net result is a swirling flow pattern of the fluid as it flows from the inlet toward the outlet and around the drive shaft 40.

The speed of the mixing paddles 54 and 56 is controllable by adjusting the motor speed through a suitable motor controller 80. If the rate of flow of fluid through the channel 12 is relatively high, then the mixing paddle speed can be adjusted to a low speed. Since the flow rate is high, the retention time will be low and the turbulence will be high, resulting in low settling efficiency and consequently very little settling of inorganic solids. Therefore, little additional mixing is required from the mixing paddles 54 and 56. At the opposite extreme, if the rate of flow of fluid through the channel 12 is relatively low, then the mixing paddle speed can be adjusted to a high speed. Since the flow rate is low, the retention time will be high and the turbulence will be low, resulting in high settling efficiency and consequently a great deal of settling of organic solids. Therefore, substantial additional mixing is required from the mixing paddles 54 and 56 to maintain the organic solids in suspension. Similarly, the mixing speed may be adjusted to account for variations in the turbulence or properties or other characteristics of the water by communication with a suitable sensing device in the water.

The adjustment of the mixing paddle speeds to increase or decrease the mixing imparted to the flowing fluid can be manual or can be automated. The speed will take into account the composition if the waste water, the extent of solids in the waste water, and especially the flow rates. The adjustment parameters can be determined in advance by experimentally or mathematically determining the flow parameters and settling efficiencies.

It can be appreciated that other means may be used to induce the spiral flow achieved by the mechanical mixers described above. For example, the mixers described above may be replaced with one or more impellers such as a turbine or propeller. Alternatively, the mechanical mixers may be replaced with pumps that pump water about a center axis of the channel. As in the case of the mechanical mixers, the pumps may be adjustable to control the degree of mixing depending upon the flow rate and water characteristics in order to achieve desired settling efficiencies. It is also possible to mount the mixer on a vertical shaft rather than a horizontal shaft so that one or more alternative flow paths is established. Further, the grit collector may be an inclined screw that pulls collected grit from an inclined trough to a collection point above the fluid surface rather than the horizontal screw described herein.

What is claimed is:

1. A settling tank for settling solids from a waste water stream, comprising:
    a channel having an inlet and an outlet so that water can flow through the channel from the inlet to the outlet;
    a mixer to induce a flow in the channel, mounted in the channel on a rotatable drive shaft generally extending in the direction from the inlet to the outlet, the mixer having a first mixing element extending radially from one side of said drive shaft and a second mixing element extending radially from a second side of said drive shaft substantially opposite the first side of said drive shaft, wherein the drive shaft includes an upstream segment toward the inlet and a downstream segment toward the outlet, and the first and second mixing elements are mounted on said upstream segment, and further comprising a third mixing element extending radially from the downstream segment in a radial direction substantially perpendicular to said first and second mixing elements, and a fourth mixing element extending radially from the downstream segment substantially opposite the third mixing element, wherein each mixing element includes at least one mixing element bracket extending radially from the drive shaft and a plurality of slats attached to and spaced radially along said bracket, the slats being substantially parallel to the drive shaft;
    a motor to rotate said drive shaft, wherein said motor may be positioned above the channel and outside of said fluid stream, the motor including a speed reducer with a shaft with a first sprocket mounted thereon, and a second sprocket mounted on the drive shaft and a drive chain connecting and transferring rotation from the reducer shaft to the drive shaft or said motor may be directly connected to the drive shaft; and
    a water behavior or property sensing device, and a motor controller in electrical communication with the motor and sensing device for controlling the motor speed and its consequent induced flow rate in response to the rate of flow of fluid through the channel.

2. A settling tank, comprising a channel to contain a fluid stream, the channel having an inlet and an outlet, and mixing means within the channel to induce flow about a mixing means axis as the fluid moves from the inlet to the outlet, and wherein the mixing means is adjustable to vary the induced flow depending on at least one of the fluid flow rate and the desired material to be settled.

3. The setting tank of claim 2, wherein the mixing means includes at least one impeller.

4. The setting tank of claim 2, wherein the mixing means includes a pump to discharge fluid.

5. A method for settling solids from a fluid stream, comprising flowing the fluid through a channel; inducing a flow in the channel using a mixer, the mixer being positioned in the channel such that the fluid spirals through the channel; and removing settled solids from the bottom of the channel; wherein the amount of induced flow is adjusted to achieve a desired balance between the settling of organic solids and inorganic solids.

6. The method of claim 5, wherein the induced flow is adjusted depending on the fluid flow rate.

7. The method of claim 3, wherein the mixer includes a substantially horizontal shaft and mixing elements extending radially from the shaft.

8. The method of claim 5, wherein the mixer includes a pump for discharging fluid about a substantially horizontal axis.

* * * * *